Jan. 5, 1960
V. C. MOORE
2,919,607
TRANSMISSION
Filed Nov. 30, 1956
2 Sheets-Sheet 1
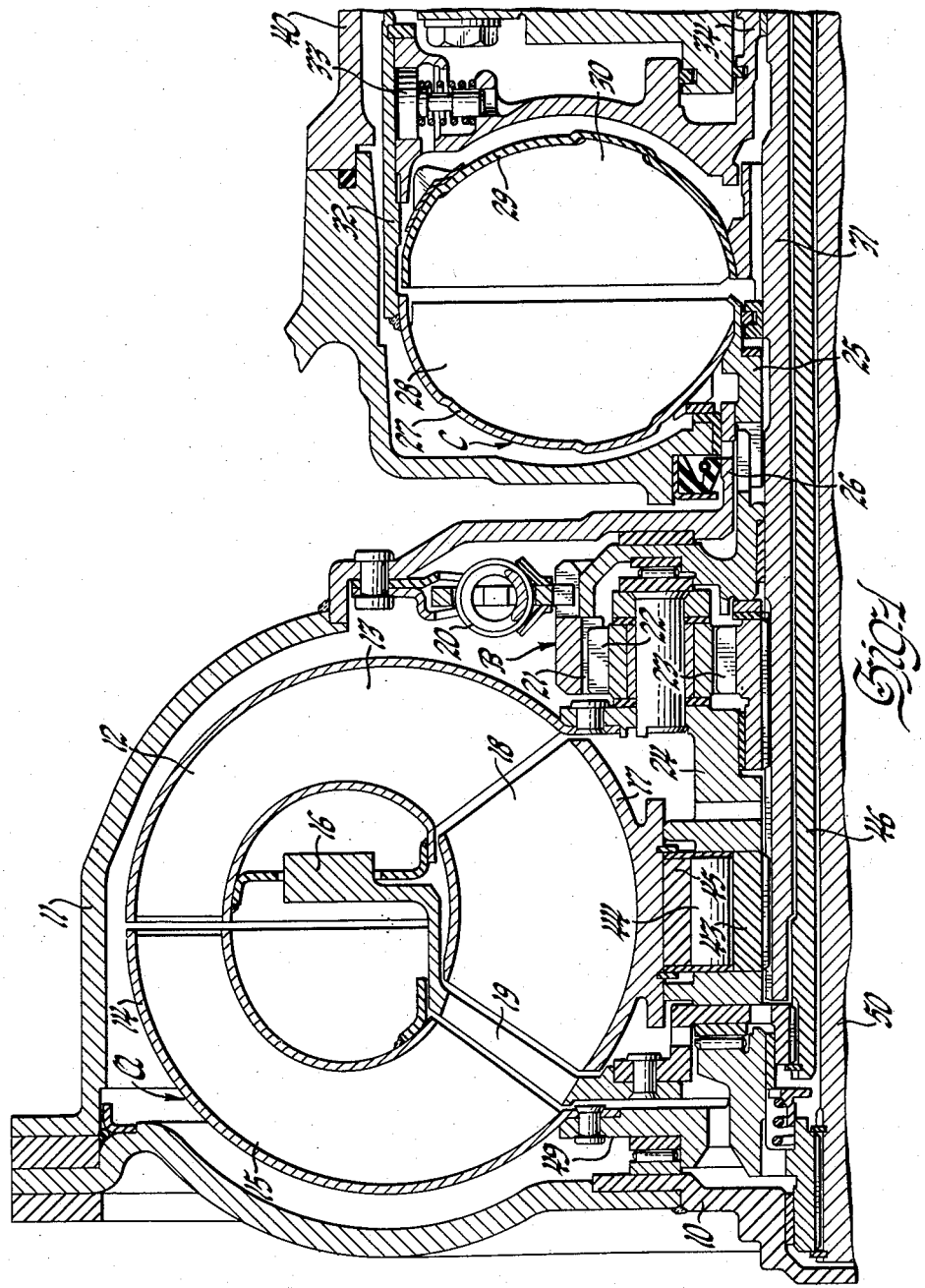
INVENTOR.
Victor C. Moore
BY
W. C. Middleton
ATTORNEY

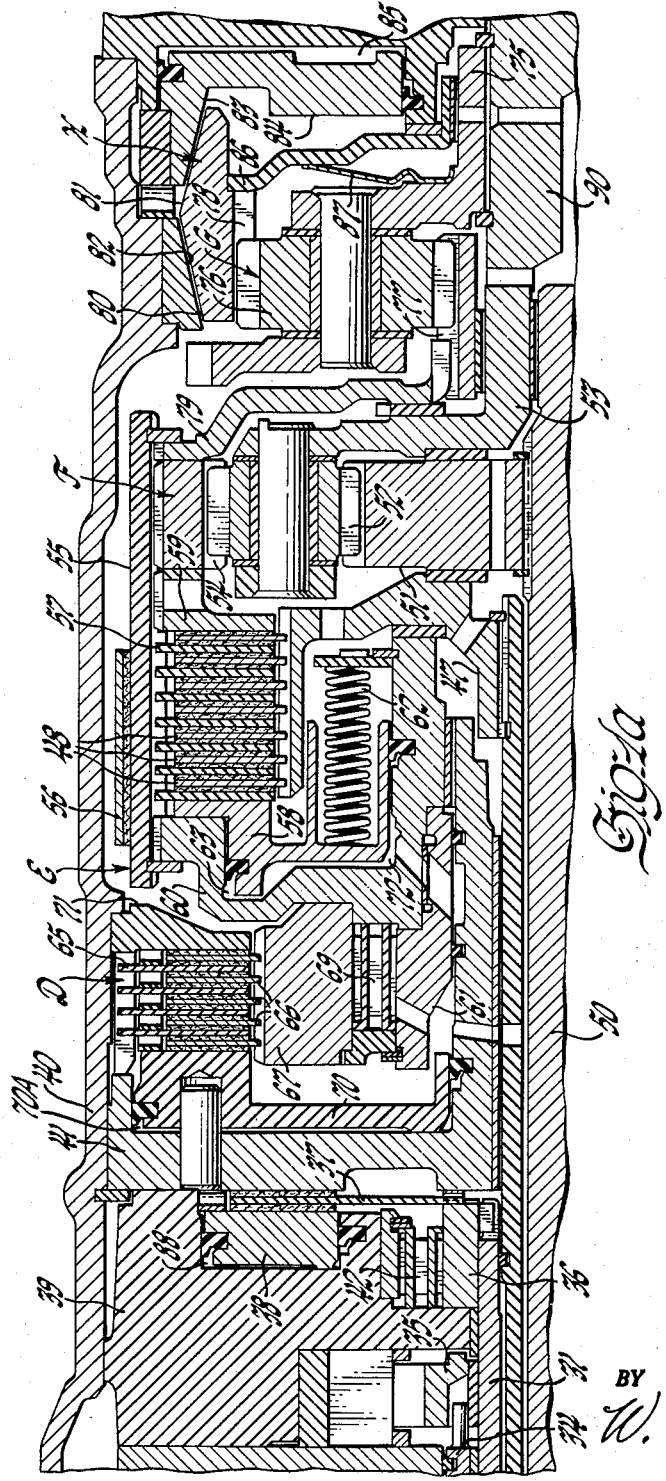

United States Patent Office 2,919,607
Patented Jan. 5, 1960

2,919,607
TRANSMISSION

Victor C. Moore, Plymouth, Mich., assignor to General Motors Corporation, Detroit, Mich., a corporation of Delaware Application November 30, 1956, Serial No. 625,441

20 Claims. (Cl. 74—688)

This invention relates to transmissions and more particularly to transmissions of the type employing planetary gearing mechanism operable to provide different drive ratios and employing a hydraulic fluid torque converter in the torque transfer path by which engine torque is delivered to the transmission output shaft. The gearing unit employed in the present invention may be of the type shown in the application of August H. Borman, Jr., et al., Serial Number 477,832, filed December 27, 1954, which shows a transmission of the planetary type having a pair of fluid coupling units interposed in the torque path by which torque is transferred from the engine to the transmission output shaft.

The present invention utilizes a fluid coupling unit and a hydraulic fluid torque converter unit having impeller, turbine and reaction elements wherein the reaction element of the torque converter is adapted to be driven by the fluid coupling turbine element whenever the fluid coupling is capable of transmitting torque and is adapted to be held against reverse rotation when the fluid coupling is incapable of transmitting torque. The reaction member of one planetary unit and the reaction member of the hydraulic torque converter are both fixed against rotation in one direction to provide maximum torque multiplication and are both rotated under power when direct drive is obtained in the planetary gearing unit. Thus, when direct drive is obtained in the one planetary gearing unit, the hydraulic torque converter acts as a fluid coupling rather than a torque converter.

An object of this invention is to provide a transmission having a planetary gearing unit adapted to drive a hydraulic torque converter impeller in either reduction or direct drive and constructed and arranged such that the torque converter reaction member will be rotated under power to cause the torque converter to act as a fluid coupling whenever the planetary gearing unit is operated under power in direct drive.

Another object of this invention is to provide a transmission having first and second planetary gearing units adapted to provide different drive ratios wherein the first planetary gearing unit is adapted to drive a hydraulic torque converter impeller in either reduction or direct drive and constructed and arranged such that the torque converter reaction member will be held against rotation in one direction when the first planetary gearing unit is operated in reduction drive and will be rotatably driven when the first planetary gearing unit is operated in direct drive, together with means for connecting one element of the second planetary gearing unit to the torque converter turbine and means for connecting a second element of the second planetary gearing unit to the torque converter impeller or to ground.

An additional object of this invention is to provide a transmission having a planetary gearing unit adapted to drive a hydraulic torque converter having an impeller connected to the planetary gearing unit to be driven thereby in either reduction or direct drive and wherein one element of the gearing unit and the torque converter reaction member are both held against reverse rotation drive; and wherein the torque converter reaction member and the one element of the planetary gearing unit are both rotatably driven when the planetary gearing unit is operated under power in direct drive.

A further object of this invention is to provide a transmission of the type described having a second planetary gearing unit having a planet carrier output member connected to a load shaft, a sun gear connected to the torque converter turbine and a ring gear adapted to be clutched to and declutched from the torque converter impeller and to provide means for preventing rotation of the ring gear in one direction when the ring gear is declutched from the torque converter impeller.

An additional object of this invention is to provide a fluid coupling adapted to be filled and emptied to control the drive ratio of one planetary gearing unit and to drive the torque converter reaction member when the one planetary gearing unit is conditioned for direct drive.

These and other objects of this invention will be apparent from the following description and claims, taken in conjunction with the accompanying drawings, in which:

Figure 1 is a sectional view of the front portion of the transmission.

Figure 1a is a sectional view of the rear portion of the transmission.

Referring to the drawings, 10 indicates the input to the transmission and may be engine driven by the engine crankshaft. A cover member 11, rotated by member 10 encloses a fluid torque converter unit A having an impeller 12 having blades 13; a turbine member 14 having blades 15, a drive member 16 rotated by impeller 12, and a reaction member 17 having blades 18. Drive member 16 extends between turbine 14 and reaction member 17 to a shaft 46, the member 16 being splined to shaft 46 so as to rotate shaft 46 at the speed of rotation of impeller 12. Member 16 is formed to provide minimum resistance to fluid flow from turbine 15 to reaction member blades 18, being preferably shaped to include spaced spokes 19 disposed between turbine 14 and reaction member 17 in the fluid flow path to present minimum resistance to flow of fluid in its normal path of travel. Cover 11 also encloses a planetary gear set B having a ring gear 21 secured to cover 11 by means of a vibration dampener 20 so as to be rotated by cover 11. A plurality of sets of planetary pinion gears 22 mesh with ring gear 21 and a sun gear 23, the pinion gears 22 being supported in a planet carrier 24 fixed to torque converter impeller 12 and adapted to drive the impeller. Sun gear 23 is splined on a shaft 31. Cover 11 is provided with a sleeve member 25 fixed to an impeller shroud 27 of a fluid coupling unit indicated at C and adapted to rotate impeller shroud 27 whenever the cover 11 is rotated. A second sleeve 26 on cover 11 overlies sleeve 25 to support the sleeve 25. Coupling C includes impeller blades 28 carried by shroud 27 fixed to sleeve 25 and turbine blades 30 fixed to a shroud 29, the hub of shroud 29 being splined to shaft 31.

A rotatable casing 32 fixed to impeller shroud 27 carries a plurality of valves 33 to control the exhaust of fluid from fluid coupling C. A sleeve extension 34 drives a fluid pressure supply pump 35 whenever the casing 32 is rotated. Sleeve shaft 31 extends to the right and has splined thereto a race member 36 having a brake member 37 secured thereto. A piston 38 carried by a non-rotatable member 39 secured to housing 40 can be moved under hydraulic pressure to lock brake member 37 to a non-rotatable member 41 also secured to transmission housing 40. One-way brake elements such as sprags 42 are disposed between race member 36 and stationary member 39. The one-way brake elements may be of standard construction as is well known in the art, and prevent rotation of sleeve shaft 31 in one direction when power is applied to the planetary gearing unit from the engine.

Planet carrier 24 extends beneath the hub of reaction member 17 to support the same and encloses one-way brake members 44 disposed between a race 43 splined to shaft 31 and outer race 45 carried by hub of member 17. Shaft 46, driven by impeller 12 is splined to a clutch plate carrier 47 of a rear unit clutch E which in turn is splined to receive clutch plates 48. One-way brake elements 44 prevent rotation of reaction member 17 in one direction with respect to sleeve shaft 31.

Turbine member 14 has its hub 49 splined to an intermediate torque transfer shaft 50 having a sun gear 51 of a rear planetary gearing unit F splined thereto and adapted to be driven by shaft 50. A plurality of sets of planet gears 52 supported in a planet carrier 53 mesh with sun gear 51 and a ring gear 54. Ring gear 54 is fixed to a drum member 55 the outer surface of which may be gripped by a brake band 56, when desired, and adapted to be actuated by a hydraulic servo in a conventional manner. A series of clutch plates 57 splined to drum 55 may be locked to clutch plates 48 by means of a hydraulically actuated piston 58 adapted to force the clutch plates against a backing member 59 carried by drum 55. A member 60 splined to drum 55 is fixed to a cylindrical member 61. Member 60 forms a cylinder to receive piston 58, the piston being yieldably biased by a spring 62 to release the clutch plates 48 and 57. Upon admission of fluid pressure to a chamber 63, piston 58 will engage clutch plates 48 and 57.

Casing 40 has splined thereto a plurality of plates 65 of a neutral brake unit D, the other plates 66 of which are splined to a race member 67. Race member 67 cooperates with tubular member 61 fixed to member 60, to form a one-way brake having sprags 69 disposed between member 67 and 61 and adapted to prevent rotation of drum 55 and ring gear 54 in one direction when power is applied to sun gear 51. A piston 70 pinned to housing 41 so as to be non-rotatable, may engage brake discs 65 and 66 against a backing member 71 fixed to housing 40 upon admission of fluid pressure to a chamber 70A between piston 70 and housing extension 41 to prevent rotation of race member 67. Planet carrier 53 is fixed to a power delivery shaft 90.

Power delivery shaft 90 has splined thereto a planet carrier 75 of a reverse planetary gearing unit G. Supported upon planet carrier 75 are a plurality of sets of planet gears 76 meshing with a sun gear 77 and a ring gear 78. A drive flange 79 connects sun gear 77 to drum 55 so that sun gear 77 is fixed to drum 55. Ring gear 78 is provided with a double tapered surface 80—81, one surface of which is adapted to engage a conical brake surface 82 fixed to transmission housing 40 and the other surface of which is adapted to contact a conical surface 83 of a piston 84. Piston 84 is disposed in a cylinder formed as part of the transmission casing and is adapted to brake ring gear 78 against rotation upon admission of fluid pressure to a control chamber 85. A disc-like extension 86 cooperates with spring washer 87 to bias the ring gear to the right to release the cone braking surfaces of ring gear 78 from each other upon exhaust of fluid pressure from chamber 85.

The transmission operating elements described are capable of operating in a plurality of forward drive ratios and reverse. For first speed ratio, with maximum torque multiplication, the front and rear planetary gearing units are conditioned to operate in reduction. The reverse planetary gearing unit idles in all forward drive ratios. In all forward drive ratios, the neutral brake D is applied to prevent rotation of race 67. In first gear operation, the fluid coupling unit C is empty and incapable of transmitting torque. Sun gear 23 and race member 43 are each held against rotation in one direction by means of one-way brake 42. Drive is accomplished through gear reduction of the front unit planetary gearing to the torque converter impeller, through torque multiplication of the converter to shaft 50 which drives sun gear 51 of the rear planetary gearing unit. Thus, in low gear the input sun gear of the rear planetary gearing unit is driven at a double reduction of the front unit gearing and the torque multiplication of the torque converter. Upon acceleration in low gear the torque multiplying effect of the torque converter will diminish until the torque converter acts as a fluid coupling. Thereafter the input sun gear of the rear planetary gearing unit is driven through torque multiplication of the front unit gearing unit alone. Drive to power delivery shaft 90 is accomplished through gear reduction of the gear unit planetary gearing unit. Ring gear 54 of the rear planetary gearing unit is held against reverse rotation by means of one-way brake 69, the race 67 of which is held against rotation by neutral brake 65—66. Thus in low gear, drive to output shaft 90 is initially accomplished by means of the fixed gear reduction of the front and rear planetary gearing units plus the variable torque multiplication of the hydraulic torque converter. At heavy throttle and heavy load the torque multiplication through the converter will be maximum. At light throttle and light load the torque multiplication through the converter will be minimum. As the load drops off or the throttle is relaxed, the converter ceases to act as a torque converter and becomes, in effect, a fluid coupling so that drive will then be through the fixed reduction of the two planetary gearing units without torque multiplication in the converter.

With the transmission conditioned for first gear operation, the flow path of torque through the transmission is as follows. Input 10 rotates coupling cover 11 which imparts rotation to ring gear 21 of the front planetary unit. With sun gear 23 held against reverse rotation by one-way brake 42, the carrier 24 is compelled to rotate in the same direction as ring gear 21, but at reduced speed. Rotation of carrier 24 causes rotation of impeller 12 of the torque converter which in turn causes rotation of turbine 14 connected to drive sun gear 51 of the rear planetary unit. Shaft 46 driven by impeller 12 will rotate clutch discs 48 at impeller speed, but no torque is transmitted through clutch plates 48 and 57 since the clutch is released. Shaft 31, race 43 of one-way brake 44, sun gear 23, and fluid coupling turbine 29 are all held against reverse rotation by means of one-way brake 42. As the speed of rotation of turbine 14 approaches the speed of rotation of impeller 12, the torque multiplying effect of the converter drops off until reaction member 18 rotates freely forwardly, whereupon the converter acts as a fluid coupling. With ring gear 54 of the rear unit held against reverse rotation by one-way brake 69, planet carrier 53 and power output shaft 90 are driven through reduction in the rear planetary unit. It will be noted that fluid coupling impeller 27 is also driven by cover 11, but since the coupling unit is empty when operating in first gear, no torque is transmitted through turbine 29.

For second speed operation, fluid coupling C is filled with liquid, whereupon rotation of coupling impeller 27 by cover 11 will cause rotation of coupling turbine 29 and sleeve shaft 31. Rotation of shaft 31 will cause rotation of sun gear 23 and will also drive reaction member 17 forwardly under power so that the reaction member under this condition of operation no longer serves as a reaction member but rather becomes a part of the impeller in function. Thus, it will be understood that in second drive ratio that sun gear 23 and reaction member 17 will be driven at substantially the same speed of rotation as ring gear 21 so that the front planetary unit is, in effect, in direct drive and the torque converter acts as a fluid coupling having in effect a relatively large impeller including members 12 and 17. There will be a slight slip loss through coupling C so that turbine 29 may not under all conditions rotate at exactly the same speed as impeller 28 but this slip loss is very slight. Accordingly impeller 12 and turbine 14 will be driven at substantially the same speed as ring gear 21. It will also be understood that with fluid in coupling C, the one-way brake 42 will release as soon as turbine 29 attempts to rotate shaft 31.

To obtain third speed operation, the fluid coupling unit C is exhausted of fluid, whereupon one-way brake 42 becomes effective to ground sun gear 23 and one-way brake 44 against reverse rotation. This provides torque reduction through the front planetary unit B and the torque converter as described in connection with first gear operation. Substantially simultaneously with the exhaust of fluid from coupling unit C, the rear planetary unit is conditioned for direct drive. This is accomplished by engaging the rear unit clutch plates 48 and 57. This locks ring gear 54 to sleeve shaft 46 driven by impeller 12 through member 16. Ring gear 54 is thereby rotated at the same speed as impeller 12 of the torque converter. When clutch plates 48 and 57 are engaged to drive ring gear 79, the one-way brake 69 automatically uncouples. Sun gear 51 is driven at the speed of rotation of the torque converter turbine 14. Under heavy load conditions there will be a substantial difference in speed of rotation of ring gear 54 and sun gear 51, so that substantial torque multiplication will occur in the rear unit gearing as well as in the torque converter itself. However the torque multiplication in the rear unit will be less than was the case when operating in first gear and will decrease as the torque multiplication of the converter drops off. More specifically, as the speed of rotation of torque converter turbine 14 approaches the speed of rotation of impeller 12, the torque multiplying effect of the converter diminishes until the converter approaches one-to-one drive and acts as a coupling. Likewise, the torque multiplication effect of the rear unit diminishes as the speed of rotation of sun gear 51 driven by turbine 14 approaches the speed of rotation of ring gear 54 driven by impeller 12. Thus, in third gear operation, there is provided a fixed gear reduction in the front planetary gearing unit plus a variable gear reduction in the rear planetary gearing unit, plus torque multiplication in the converter, the torque multiplication through the rear unit becoming of decreasing effect as the torque multiplication in the converter diminishes. At light throttle, high speed operation, the rear unit may be a substantially one-to-one drive.

To obtain fourth gear or direct drive, the fluid coupling unit C is again filled with fluid to establish direct drive through the front planetary gearing unit as heretofore explained. In direct drive the converter reaction member 17 is again positively driven by shaft 31 so that the reaction member again functions as a part of the impeller. Both units operate in direct drive in fourth gear.

To obtain reverse operation, neutral brake D is released, reverse brake H is applied, and coupling C is emptied of fluid. When the ports are so conditioned, drive will be through reduction in the front unit and the torque converter unit as heretofore described in connection with first and third gear operation. However, in the rear unit, with neutral brake D released, the rear unit ring gear has no ground and is free to rotate. However, the transmission output shaft 90, being connected to load, offers an initial resistance to rotation of carrier 53. Consequently rotation of sun gear 51 of the rear unit by torque converter turbine 14 will cause ring gear 54 to rotate reversely with respect to the direction of rotation of sun gear 51. Rotation of ring gear 54 of the rear unit causes a similar rotation of sun gear 77 of the reverse gearing unit. With ring gear 78 held against rotation by the reverse brake, planet carrier 75 is driven in reduction in reverse. The drive ratio in reverse is such as is afforded by the combination of the gear ratios of the rear planetary gearing unit, the reverse planetary gearing unit, and the torque multiplication of the torque converter.

Brake 37, fixed to shaft 31, may be applied when desired by admitting fluid under pressure to a chamber 88 adjacent piston 38. This brake is an overrun brake effective when applied to prevent rotation of sun gear 23 of the front planetary gearing unit to prevent free-wheeling in the front unit when the vehicle overruns the engine so as to increase the braking effect of the engine. This feature is particularly useful when descending long grades to prevent undue wear and overheating of the vehicle brakes.

Control valving for controlling the various brakes and clutch 48—57, is fully shown and described in the heretofore identified application of August H. Borman, Jr., et al., and may be utilized in the present disclosure.

Various changes and modifications may be made in the construction and arrangement of the parts comprising this invention without departing from spirit and scope thereof as set forth in the appended claims.

What is claimed is:

1. In a transmission for an engine driven vehicle, a hydraulic torque converter having impeller, turbine and reaction members, respectively, a planetary gearing unit operable to drive said impeller in either one of two drive ratios, said planetary gearing unit including a planet carrier directly connected to said impeller for rotation therewith and supporting a plurality of planet pinions in mesh with a ring gear and a reaction sun gear, means connecting said ring gear directly to said engine, brake means for preventing reverse rotation of both said torque converter reaction member and said reaction sun gear when said gear unit is operated in one of said drive ratios, and means for drivingly rotating both said converter reaction member and said reaction sun gear when said gear unit is operated in the other of said drive ratios.

2. In a transmission adapted to provide a plurality of drive ratios, a hydraulic torque converter having impeller, turbine, and reaction members, a first planetary gearing unit operable to drive said torque converter impeller in either reduction or direct drive, means for braking said reaction member against rotation in one direction when said planetary gearing unit is operated in reduction drive, means for drivingly rotating said reaction member when said planetary gearing unit is operated in direct drive, a second planetary gearing unit having one element thereof connected to a load shaft, means for connecting a second element of said second planetary gearing unit to said turbine, means including a clutch operable to connect a third element of said second planetary gearing unit to said torque converter impeller, and means for preventing rotation of said third element in one direction when said clutch is released.

3. In a transmission adapted to provide a plurality of drive ratios, a hydraulic torque converter having impeller, turbine and reaction members, a planetary gearing unit operable to drive said impeller in either reduction or direct drive, said gearing unit including a planet carrier connected to drive said impeller, a set of planet gears in mesh with a ring gear and a sun gear, means for rotating said ring gear, means for preventing rotation of said sun gear and said torque converter reaction member when said planetary gearing unit is operated in reduction drive, and means for drivingly rotating said sun gear and said torque converter reaction member when said planetary gearing unit is operated in direct drive.

4. In a transmission adapted to provide a plurality of drive ratios, a hydraulic torque converter having impeller, turbine and reaction members, a first planetary gearing unit operable to drive said impeller in either reduction drive or direct drive, said gearing unit including a planet carrier connected to drive said impeller, a set of planet gears in mesh with a ring gear and a sun gear, means for rotating said ring gear, one way brake means for preventing rotation of said sun gear and said torque converter reaction member when said planetary gearing unit is operated in reduction drive, means for drivingly rotating said sun gear and said torque converter reaction member when said planetary gearing unit is operated in direct drive, a second planetary gearing unit having a planet carrier connected to drive an output shaft, a plurality of planet gears in mesh with a sun gear and a ring gear, means connecting said sun gear to said turbine member, means including a clutch operable to connect said ring gear to said torque converter impeller, and one-way brake means operable to prevent rotation of said ring gear in one direction when said clutch is released.

5. In a transmission for providing a plurality of forward drive ratios, a fluid torque converter having impeller, turbine and reaction members, respectively, a fluid coupling unit having an impeller and a turbine member and adapted to be filled with and emptied of working fluid, a planetary gearing unit connected to drive said torque converter impeller, means for driving one element of said planetary gearing unit and said fluid coupling impeller, and brake means operable to prevent rotation of another element of said planetary gearing unit and said torque converter reaction member when said fluid coupling is emptied of fluid.

6. In a transmission for providing a plurality of forward drive ratios, a fluid torque converter having impeller, turbine and reaction members, respectively, a fluid coupling unit having an impeller and a turbine member and adapted to be filled with and emptied of working fluid, a planetary gearing unit connected to drive said torque converter impeller, means for rotating one element of said planetary gearing unit and said fluid coupling impeller, a sleeve member operably connected to another element of said planetary gearing unit and to said torque converter reaction member, and means for preventing rotation of said sleeve member when said fluid coupling is emptied of working fluid.

7. In a transmission for providing a plurality of forward drive ratios, a fluid torque converter having impeller, turbine and reaction members, respectively, a fluid coupling unit having an impeller and a turbine and adapted to be filled with and emptied of working fluid, a planetary gearing unit connected to drive said torque converter impeller, means for rotating one element of said planetary gearing unit and said fluid coupling impeller, means for braking another element of said planetary gearing unit and said torque converter reaction member against rotation in one direction when said fluid coupling unit is emptied of working fluid, said fluid coupling turbine being effective to rotate said other planetary gearing unit element and said torque converter reaction member when said fluid coupling is filled with working fluid.

8. In a transmission for providing a plurality of forward drive ratios, a hydraulic torque converter having impeller, turbine and reaction members, respectively, a fluid coupling unit having impeller and turbine members, respectively, and adapted to be filled with and emptied of working fluid, a planetary gearing unit having one element thereof connected to drive said torque converter impeller member, means for rotating a second element of said planetary gearing unit and said fluid coupling impeller, a sleeve member fixed to a third element of said planetary gearing unit and to said fluid coupling turbine, one-way brake means between said sleeve and said torque converter reaction member, and brake means operable to prevent rotation of said sleeve.

9. The combination set forth in claim 8 wherein the brake means for preventing rotation of the sleeve includes a one-way brake for preventing rotation of the sleeve when the fluid coupling is empty of working fluid and permits rotation of the sleeve in one direction when the fluid coupling is filled with working fluid.

10. The combination set forth in claim 8 wherein the brake means for preventing rotation of the sleeve includes a one-way brake for preventing rotation of the sleeve in one direction when the fluid coupling is empty of working fluid and permits rotation of the sleeve in one direction when said fluid coupling is filled with working fluid, and additional selectively operable brake means for preventing rotation of the sleeve in any direction.

11. In a transmission for providing a plurality of forward drive ratios, a hydraulic torque converter having impeller, turbine and reaction members, respectively, a fluid coupling unit having an impeller and a turbine and adapted to be filled with and emptied of working fluid, a planetary gearing unit having one element thereof connected to drive said torque converter impeller, common drive means for rotating a second element of said planetary gearing unit and said fluid coupling impeller, a sleeve member fixed to a third element of said planetary gearing unit and to said fluid coupling turbine, one-way brake means for preventing rotation of said sleeve member in one direction when said fluid coupling is emptied of working fluid, one-way brake means between said sleeve and said torque converter reaction member, said first mentioned one-way brake means being automatically releasable when said fluid coupling is filled with working fluid to permit said fluid coupling turbine to rotate said sleeve, said sleeve member being effective to drive said torque converter reaction member and said third planetary gearing element at substantially the speed of rotation of said torque converter impeller member when said fluid coupling is filled with working fluid.

12. In a transmission for providing a plurality of forward drive ratios, a hydraulic torque converter having impeller, turbine and reaction members, respectively, a fluid coupling unit having an impeller and a turbine and adapted to be filled with and emptied of working fluid, a planetary gearing unit having a planet carrier connected to drive said torque converter impeller, said gearing unit having planet gears in mesh with a ring gear and a sun gear, common drive means for rotating said ring gear and said fluid coupling impeller, a sleeve member fixed to said fluid coupling turbine and said sun gear, a one-way brake between said converter reaction member and said sleeve member, a one-way brake for preventing rotation of said sleeve member in one direction when said fluid coupling is emptied of working fluid, said first-mentioned one-way brake being effective to prevent rotation of said reaction member in said one direction when said fluid coupling is emptied of working fluid, said second-mentioned one-way brake being automatically released when said fluid coupling is filled with working fluid to permit said fluid coupling turbine to drive said sleeve member, said first-mentioned one-way brake being effective to drive said torque converter reaction member at substantially the speed of rotation of the torque converter impeller member when said fluid coupling is filled with working fluid.

13. In a transmission for providing a plurality of forward drive ratios, a fluid torque converter having impeller, turbine and reaction members, a fluid coupling unit having an impeller and a turbine and adapted to be filled with and emptied of working fluid, a planetary gearing unit connected to drive said torque converter impeller, means for rotating one element of said planetary gearing unit and said fluid coupling impeller, means for braking another element of said planetary gearing unit and said torque converter reaction member against rotation in one direction when said fluid coupling is emptied of working fluid, said fluid coupling turbine being effective to rotate said other planetary gearing unit element and said torque converter reaction member when said fluid coupling is filled with working fluid, a second planetary gearing unit, means connecting one element of said second planetary gearing unit to said torque converter turbine, means including a clutch for connecting and disconnecting a second element of said second planetary gearing unit to and from said torque converter impeller, a third element of said second planetary gearing unit connected to a load shaft, and means for preventing rotation of said second planetary gearing element in one direction when said clutch is released.

14. In a transmission for providing a plurality of forward drive ratios, a fluid torque converter having impeller, turbine and reaction members, a fluid coupling having an impeller and a turbine and adapted to be filled with and emptied of working fluid, a planetary gearing unit having a ring gear, a sun gear and planet gears in mesh with said ring and sun gears supported in a planet carrier connected to drive said torque converter impeller, means for rotating said ring gear and said fluid coupling impeller, means for braking said sun gear and said torque converter reaction member against rotation in one direction when said fluid coupling is emptied of working fluid, said fluid coupling turbine being effective to rotate said sun gear and torque converter reaction member when said fluid coupling is filled with working fluid, a second planetary gearing unit having a planet carrier fixed to a load shaft and supporting a plurality of planet gears in mesh with a ring gear and a sun gear, means connecting said last-mentioned sun gear to torque converter turbine member, means including a clutch for connecting said ring gear to and disconnecting said ring gear from said torque converter impeller, and means operable when said clutch is disengaged to prevent rotation of said ring gear in one direction.

15. In a transmission for providing a plurality of forward drive ratios, a fluid torque converter having impeller, turbine and reaction members, a fluid coupling having an impeller and a turbine and adapted to be filled with and emptied of working fluid, a planetary gearing unit having a planet carrier drivingly connected to said torque converter impeller and supporting a plurality of planet gears in mesh with a ring gear and a sun gear, power input means for rotating said ring gear and said fluid coupling impeller, a sleeve member fixed to said sun gear and said fluid coupling turbine, a one-way brake for preventing rotation of said sleeve when said fluid coupling is empty of working fluid, a one-way brake between said sleeve and said torque converter reaction member for preventing rotation of said reaction member when said sleeve is held against rotation, said fluid coupling turbine being effective to rotate said sleeve, said sun gear and said torque converter reaction member when said coupling is filled with working fluid, a second planetary gearing unit having a planet carrier fixed to a load shaft and supporting a plurality of planet gears in mesh with a ring gear and a sun gear, means connecting said sun gear to said torque converter turbine member, means for connecting said ring gear to and for disconnecting said ring gear from said torque converter impeller, and a one-way brake for preventing rotation of said ring gear in one direction when said clutch is disengaged.

16. In a transmission for providing a plurality of forward drive ratios, a fluid torque converter having impeller, turbine and reaction members, a fluid coupling unit having an impeller and turbine and adapted to be filled with and emptied of fluid, a planetary gearing unit connected to drive said torque converter impeller, means for rotating one element of said planetary gearing unit and said fluid coupling impeller, means including a first sleeve for braking another element of said planetary gearing unit and said torque converter reaction member against rotation in one direction when said fluid coupling is emptied of working fluid, said fluid coupling turbine being effective to rotate said first sleeve said other planetary gearing unit element and said torque converter reaction member when said fluid coupling is filled with working fluid, a second planetary gearing unit, means including an intermediate torque transfer shaft connecting one element of said second planetary gearing unit to said torque converter turbine, means including a clutch and a second sleeve for connecting and disconnecting a second element of said second planetary gearing unit to and from said torque converter impeller, said second sleeve extending intermediate said first sleeve and said intermediate torque transfer shaft, a third element of said second planetary gearing unit connected to a load shaft, and one way brake means for preventing rotation of said second element of said second planetary gearing unit in one direction when said clutch is released.

17. In a transmission for providing a plurality of forward drive ratios, a fluid torque converter unit having an impeller turbine and a reaction member, a fluid coupling having an impeller and a turbine and adapted to be filled with and emptied of working fluid, a planetary gearing unit having a ring gear, a sun gear and planet gears in mesh with said ring and sun gears supported in a planet carrier connected to drive said torque converter impeller, means for rotating said ring gear and said fluid coupling impeller, means including a first sleeve for braking said sun gear and said torque converter reaction member against rotation in one direction when said fluid coupling is emptied of working fluid, said fluid coupling turbine being effective to rotate said sleeve, sun gear and torque converter reaction member when said fluid coupling is filled with working fluid, a second planetary gearing unit having a planet carrier fixed to a load shaft and supporting a plurality of planet gears in mesh with a ring gear and a sun gear, a torque transfer shaft connecting said last-mentioned sun gear to said torque converter turbine, a second sleeve extending between said first sleeve and said torque transfer shaft and drivingly connected to said torque converter impeller, an engageable and releasable clutch for connecting and releasing said second gear unit ring gear to and from said second sleeve, and brake means operable when said clutch is released to prevent rotation of said ring gear in one direction.

18. In a transmission for providing a plurality of forward drive ratios, a fluid torque converter having impeller, turbine, and reaction members, a fluid coupling having an impeller and a turbine and adapted to be filled with and emptied of working fluid, a planetary gearing unit having a planet carrier drivingly connected to the torque converter impeller and supporting a plurality of planet gears in mesh with a ring gear and a sun gear, power input means for rotating said ring gear and said fluid coupling impeller, a first sleeve fixed to said sun gear and said fluid coupling turbine, a one-way brake for preventing rotation of said first sleeve when said fluid coupling is empty of working fluid, a one-way brake between said first sleeve and said torque converter reaction member for preventing rotation of said reaction member when said first sleeve is held against rotation, said fluid coupling turbine being effective to rotate said first sleeve, said sun gear and said torque converter reaction member when said coupling is filled with working fluid, a second planetary gearing unit having a planet carrier fixed to a load shaft and supporting a plurality of planet gears in mesh with a ring gear and a sun gear, an intermediate torque transfer shaft connecting said sun gear to said torque converter turbine, a second sleeve extending between said first sleeve and said intermediate torque transfer shaft and drivingly connected to said torque converter impeller, a clutch adapted to connect and disconnect said ring gear to and from said second sleeve, and a one-way brake for preventing rotation of said ring gear in one direction when said clutch is released.

19. The combination set forth in claim 16 including a selectively operable brake adapted to prevent rotation of said first sleeve in any direction when said brake is engaged.

20. The combination set forth in claim 17 including a selectively operable brake adapted to prevent rotation of said first sleeve in any direction when said brake is engaged.

References Cited in the file of this patent

UNITED STATES PATENTS

| | | |
|---|---|---|
| 2,397,634 | Voytech | Apr. 2, 1946 |
| 2,481,529 | Norelius | Sept. 13, 1949 |